United States Patent
Voiron et al.

(10) Patent No.: US 12,270,312 B2
(45) Date of Patent: Apr. 8, 2025

(54) VENTILATION RING FOR THE REAR BEARING SUPPORT MEMBER OF AN AIRCRAFT TURBINE ENGINE

(71) Applicant: SAFRAN AIRCRAFT ENGINES, Paris (FR)

(72) Inventors: Mickaël Voiron, Moissy-Cramayel (FR); Fabien Stéphane Garnier, Moissy-Cramayel (FR); Nicolas Ovaere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 44 days.

(21) Appl. No.: 18/273,138

(22) PCT Filed: Jan. 20, 2022

(86) PCT No.: PCT/FR2022/050109
§ 371 (c)(1),
(2) Date: Jul. 19, 2023

(87) PCT Pub. No.: WO2022/157456
PCT Pub. Date: Jul. 28, 2022

(65) Prior Publication Data
US 2024/0125249 A1    Apr. 18, 2024

(30) Foreign Application Priority Data
Jan. 21, 2021 (FR) ........................................ 2100558

(51) Int. Cl.
*F01D 25/16* (2006.01)
*F01D 25/12* (2006.01)

(52) U.S. Cl.
CPC ......... *F01D 25/125* (2013.01); *F01D 25/162* (2013.01); *F05D 2230/23* (2013.01); *F05D 2260/20* (2013.01)

(58) Field of Classification Search
CPC .. F01D 25/125; F01D 25/162; F04D 2230/23; F04D 2260/20
See application file for complete search history.

(56) References Cited

U.S. PATENT DOCUMENTS

2005/0241290 A1* 11/2005 Lapergue ................ F01D 21/04
60/791
2012/0102910 A1* 5/2012 Francisco ............... F01D 25/30
60/39.5

(Continued)

FOREIGN PATENT DOCUMENTS

FR    3 005 099 A1    10/2014
FR    3 053 728 A1    1/2018

OTHER PUBLICATIONS

International Search Report issued May 16, 2022 in International Application No. PCT/FR2022/050109.

(Continued)

*Primary Examiner* — Elton K Wong
*Assistant Examiner* — Theodore C Ribadeneyra
(74) *Attorney, Agent, or Firm* — Sughrue Mion, PLLC

(57) ABSTRACT

A ventilation ring for a bearing support member of an aircraft turbine engine includes two or more tubular walls and one or more spacer walls. The two or more tubular walls extend opposite each other, and one or more of the tubular walls includes a main portion and a base, the base having a thickness greater than a thickness of the main portion. The one or more spacer walls connect the two or more tubular walls. The one or more spacer walls have one or more apertures extending into the base and a rim around the aperture. An entirety of the rim has a thickness greater than a thickness of the spacer wall at a distance from the rim.

12 Claims, 6 Drawing Sheets

(56) References Cited

U.S. PATENT DOCUMENTS

2013/0283757 A1\* 10/2013 Bordne .................... F02C 7/06
                                                                             60/39.08
2015/0147157 A1    5/2015 Fontanel et al.
2022/0220896 A1\*  7/2022 Morris .................... F01D 5/046

OTHER PUBLICATIONS

Search Report issued in French Application No. 2100558, completed Sep. 2, 2021.

\* cited by examiner

VENTILATION RING FOR THE REAR BEARING SUPPORT MEMBER OF AN AIRCRAFT TURBINE ENGINE

CROSS REFERENCE TO RELATED APPLICATIONS

This application is a National Stage of International Application No. PCT/FR2022/050109 filed Jan. 20, 2022, claiming priority based on French Patent Application No. 2100558 filed Jan. 21, 2021, the contents of each of which being herein incorporated by reference in their entireties.

FIELD OF THE INVENTION

The invention relates to aircraft turbine engines, in particular to the ventilation ring of the rear bearing support member of a turbine engine.

STATE OF THE ART

In an aircraft turbojet engine, the rotor shaft is supported by bearings connected to the stator. One of the bearings is located aftwardly.

This bearing is surrounded by a ring forming a circuit for a lubricating and coolant liquid such as oil. On the periphery of this liquid circuit, it also forms a ventilation circuit.

For this purpose, it comprises tubular walls extending opposite each other in a direction radial to the axis of the turbine engine, and frustoconical spacer walls or flanges linking the tubular walls in pairs. The spacer walls have apertures for the passing of ventilating air.

Having regard to the complex shape of the ring, it is advantageously formed by additive manufacturing. However, this manufacturing method does not allow easy, reliable forming of the apertures of the spacer walls. There is in fact a strong risk of local collapse of the part when in the progress of manufacture with the metal powder, considering the geometry thereof and the number of apertures to be made. Such collapse requires the interruption of manufacture, the downtime being a source of delays.

This is the reason why it is preferable to construct the part by additive manufacturing without the apertures i.e. by forming supports to occupy the apertures and to form the apertures at a second stage by machining.

However, this latter method generates its own disadvantages. It requires reworking by machining, which amounts to a second manufacturing step. In addition, this machining is conducted in areas having difficult access being positioned between the tubular walls. This constraint relating to access in turn leads to a constraint regarding the shape of the apertures: circular machining of the aperture in a direction parallel to the axis of the frustrum of the wall leads to an aperture of oval (or elliptical) shape, which means it is difficult to obtain a different shape. In addition, additive manufacturing without forming the apertures complicates the depowdering operation whereby residual powder dispersed during manufacture is removed from the part obtained.

It is therefore one objective of the invention to facilitate the obtaining of the ring via additive manufacturing to prevent the risk of collapse, to avoid reworking by machining and the use of supports, and without comprising depowdering.

DESCRIPTION OF THE INVENTION

For this purpose, in the invention, a ventilation ring is provided for a bearing support member of an aircraft turbine engine, the ring comprising:
at least two tubular walls extending opposite each other,
at least one of the tubular walls comprising a main portion and a base having a thickness greater than a thickness of the main portion, and
at least one spacer wall connecting the tubular walls, the spacer wall having at least one aperture extending into the base,
the spacer wall having a rim around the aperture, the rim on the entirety thereof having a thickness greater than a thickness of the spacer wall away from the rim.

In this manner, consideration is given to the presence of the tubular walls to define a geometry of apertures adapted to additive manufacturing. To achieve this objective, the aperture(s) are defined so that the opening and/or closing thereof is positioned in the preferably radiating base(s) of adjacent walls. This provides good continuity of the part at the time of manufacture in the junction area of the apertures with the tubular wall(s). The base allows gradual construction of an end portion of the aperture over several layers, having regard to the incline of the spacer wall which is generally frustoconical. At the same time, the other end portion of the aperture is constructed at a distance, allowing a connecting region to be obtained between the two portions on completion of the construction of the aperture.

The solution applied therefore entails modifying the geometry of the apertures to facilitate manufacture of the part and to avoid the use of supports in a scarcely accessible area. Advantage is therefore drawn from the particular geometry of the part to construct ventilation apertures without any risk of collapse.

With the invention, it is possible to reduce the time and cost of post-additive manufacturing operations (depowdering, machining, etc.). It allows:
facilitated closing of the contour of the apertures,
facilitated depowdering of the part, when necessary, by means of the opening formed over the entire width of the cavity (from wall to wall) by the aperture,
the elimination of manufacturing supports, and
a reduced risk of machine stoppage during manufacture.

Additionally, the ring may have at least one of any of the following characteristics:
the base has at least one surface with rounded concave profile forming a transition from one surface of the tubular wall to a surface of the spacer wall;
the aperture extends into the base of the two tubular walls;
the spacer wall has several apertures extending into the base of the tubular wall or into the base of the two tubular walls;
the spacer walls are at least two in number, and each has several apertures;
the apertures of the spacer walls are arranged in a staggered arrangement;
the apertures of the spacer walls coincide with each other;
the tubular walls are at least four in number, and
since one of the spacer walls lies at a greater distance from the axis than the other spacer wall, or than the other spacer walls, lower apertures among the apertures extend into a lower part of the spacer wall the furthest distance from the axis, the lower apertures all lying solely in one half from among the left and right halves of the spacer wall relative to the axis.

In this latter case, it is of advantage to add apertures on the side opposite the direction of the airflow in the ring, to prevent possible spattering of oil-containing air. These apertures do not have any counterpart on the other side of the ring.

Provision is also made in the invention for an aircraft turbine engine comprising a ring of the invention.

Finally, provision is also made in the invention for a method to manufacture a ring of the invention via additive manufacturing, in particular by laser beam melting.

DESCRIPTION OF THE FIGURES

A description of one embodiment of the invention will now be given and a variant thereof as nonlimiting examples with reference to the drawings in which.

The Figures illustrate an aircraft turbojet engine 2 which forms one embodiment of the turbine engine of the invention. The turbojet engine 1 here forms a twin-shaft turbofan jet engine, but the invention is not limited to this arrangement. It particularly also applies to an axial-flow turbojet engine. The turbine engine comprises a stator 6 and a rotor 4 mounted rotatably mobile relative to the stator about a main axis X-X.

Figure 1:
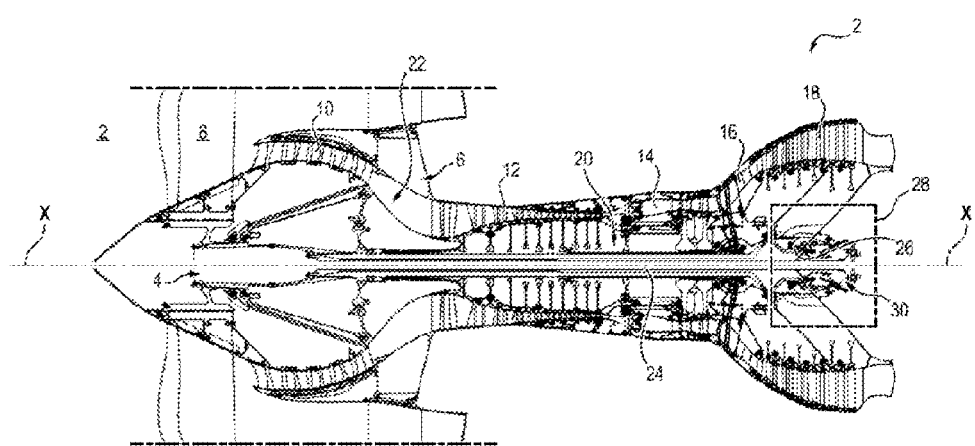
FIG. 1 is an axial cross-sectional view of an aircraft turbojet engine according to one embodiment of the invention.

From upstream to downstream, therefore from left to right in FIG. 1, it comprises a fan 8, a low-pressure compressor 10, a high-pressure compressor 12, a combustion chamber 14, a high-pressure turbine 16 and a low-pressure turbine 18. These elements, with the exception of the fan, are part of a central portion 20 of the turbojet engine. The mobile parts thereof rotating about the axis X-X form the rotor.

The high-pressure compressor 12, the combustion chamber 14 and the high-pressure turbine 16 form a high-pressure body which, together with the low-pressure compressor 10 and the low-pressure turbine 18, define a main stream 22 of airflow.

A nacelle surrounds the fan 8 and the central portion 20 to form a fan compartment and to define a secondary stream of airflow.

The rotor comprises a shaft 24 which here is a twin-shaft. The shaft comprises an outer shaft via which the low-pressure turbine 18 is connected to the low-pressure compressor 10 and to the fan 8. It also comprises an inner shaft extending inside the outer shaft and via which the high-pressure turbine 16 is connected to the high-pressure compressor 12.

Figure 2:
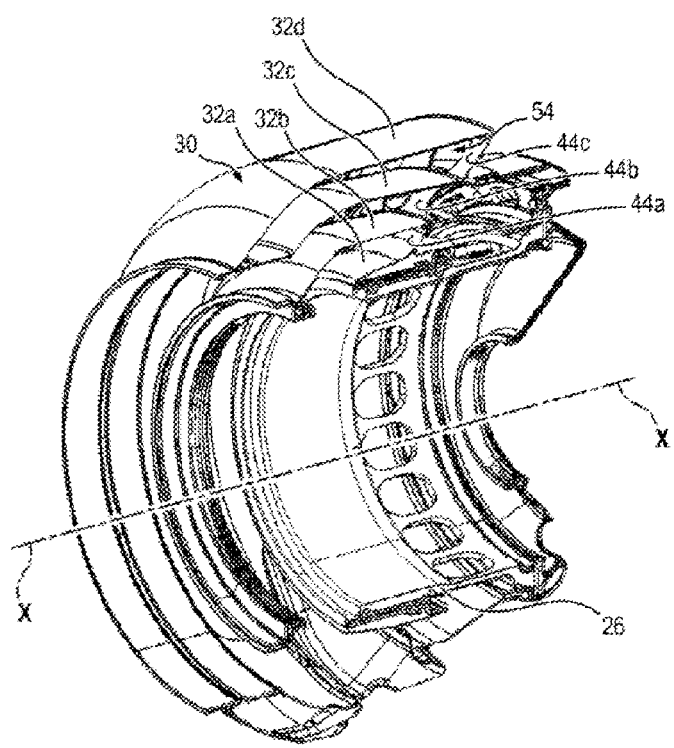
FIG. 2 is a perspective cross-sectional view of some parts of the aft portion of the turbojet engine in the preceding Figure.

The shaft 24 is connected to the stator being supported by several rotating bearings which here are five in number. In the remainder hereof, focus is on the rear bearing support member 26 which is the bearing positioned the furthest aft i.e. the furthest downstream of the airflow. The bearing is a roller bearing and is not illustrated in detail. The support member 26 is illustrated in the framed part 28 in FIG. 1 and in more detail in FIG. 2. It is itself supported by a cooling ring 30 which surrounds the support member.

The ring 30 comprises tubular walls 32*a-d* which here are four in number. Each of the walls is of tubular or sleeved shape. They are coaxial with axis X-X. The walls following after each other in succession extend opposite each other. Wall 32*a* is the innermost wall and is in contact with the bearing support member 26. Wall 32*d* is the outermost wall and the wall which extends at greatest distance from the axis.

Figure 3:
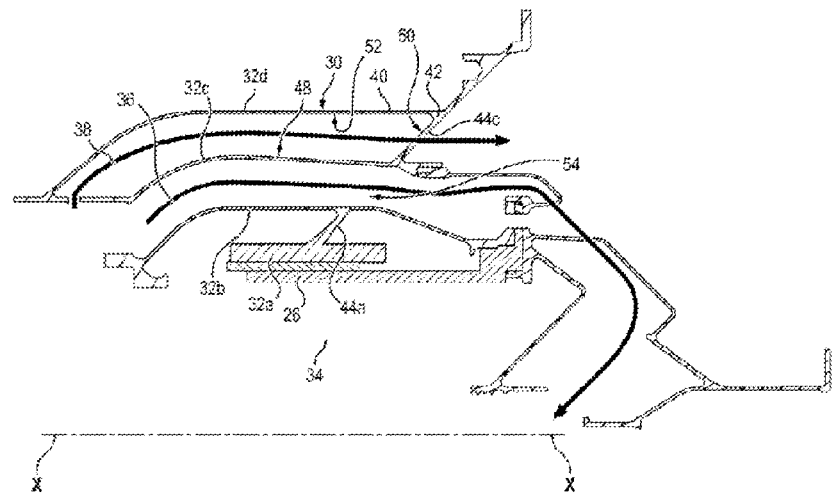
FIG. 3 is a cross-sectional view of the ring illustrating the rear bearing of the turbojet engine in the preceding Figures, showing the air and oil pathway.

The innermost walls 32*a*, 32*b* together with each other and with the bearing 26 form a tubular duct for the passing of cooling and lubricant liquid such as oil. The oil circuit is indicated by arrow 34 in FIG. 3. Walls 32*b*, 32*c* together form a tubular ventilation duct. The same applies to the outermost walls 32*c*, 32*d*. The two ventilation circuits are indicated by arrows 36 and 38 in the Figure.

Figure 8:
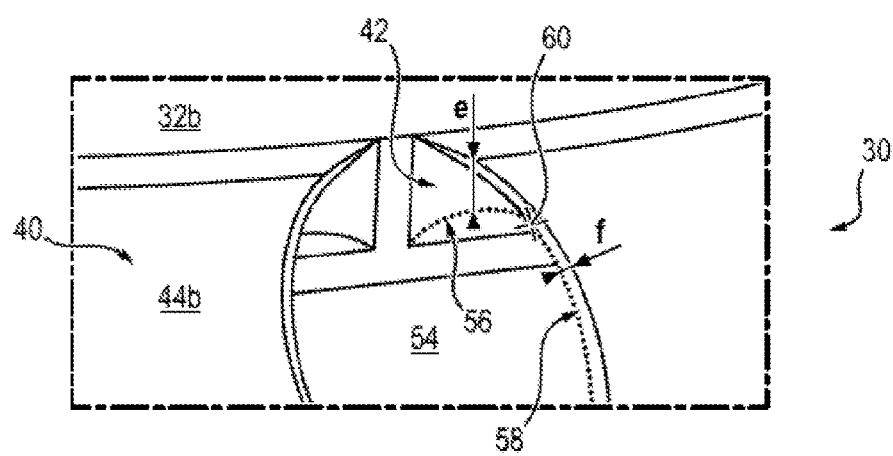
FIG. 8 is a view on a larger scale of part of FIG. 7 illustrating the construction process of an aperture of the wall by additive manufacturing.

Each tubular wall 32*a-d* is here composed of a main portion 40 and a base 42 having a thickness e greater than a thickness f of the main portion. These thicknesses are illustrated in FIG. 8.

Figure 5:
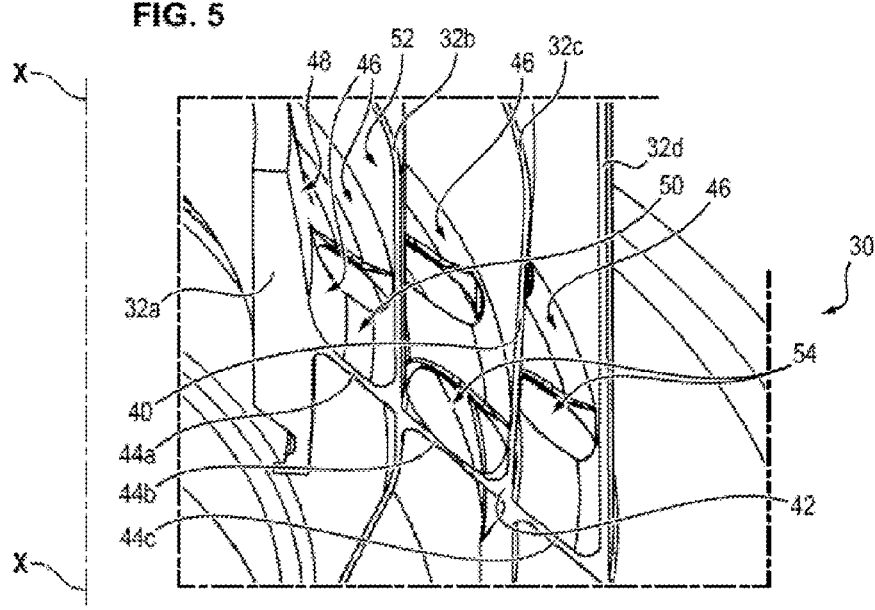
FIGS. 5 to 7 are partial cross-sectional views with breakout of the ring showing the spacer walls.
Figure 6:
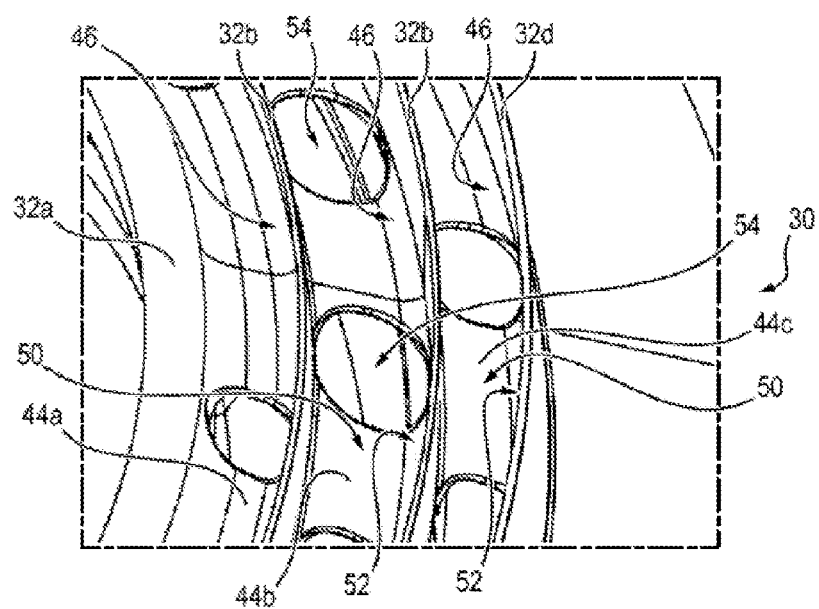
Figure 7:
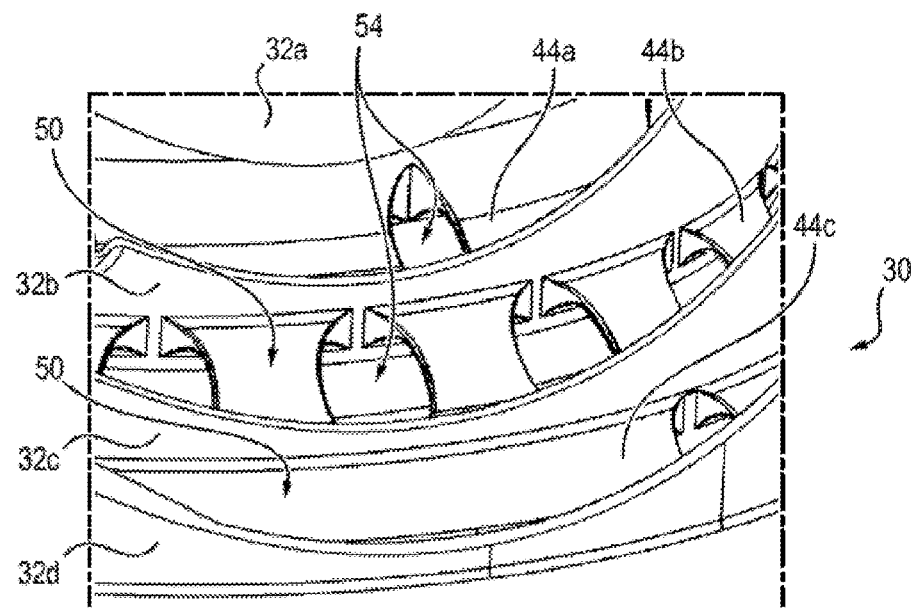

The ring 30 also comprises spacer walls 44*a-c*, or flanges, connecting the tubular walls 32*a-d* in pairs. The spacer walls here are three in number. Spacer wall 44*a* extends between the tubular walls 32*a* and 32*b*, and so forth. The spacer walls 44*a-c* are arranged here in the continuation of each other as can be seen in FIG. 5. They are therefore geometrically formed by the same conical frustum. The largest diameter of the frustum lies downstream, the axis of the frustum being axis X-X.

As can be seen for example in FIG. 5, the base of the tubular wall 32*a* the closest to the axis has a surface 46 with rounded concave profile forming a transition from an outer surface 48 of the tubular wall to a rear surface 50 of the spacer wall. The base therefore comprises a radiating zone.

Similarly, the base of the tubular wall 32*b* has a surface 46 with rounded concave profile forming a transition from the rear surface 50 to an inner surface 52 of the wall, positioned facing the outer surface 48 of the tubular wall 32*a*. The same applies to the junction between the base of wall 32*c* with spacer wall 44*b* and to the junction between the base of wall 32*d* with spacer wall 44*c*, and more generally to the junctions of all the bases with all the spacer walls in the present example.

Each of the spacer walls 44*a-c* has several apertures 54 for the passing of oil (for wall 44*a*) and the passing of air (for walls 44*b* and 44*c*).

In the present example, the apertures 54 are ten in number in the innermost spacer wall 42*a*, nineteen in the median spacer wall 44*b* and fourteen in the outermost spacer wall 44*c*. These numbers are evidently nonlimiting. On each spacer wall the apertures 54 are identical, extend at the same distance from the axis and are equidistant, but do not extend over the entire wall The positioning of the apertures is particularly illustrated in FIG. 4.

In addition, on each spacer wall, each aperture 54 extends into the base of the two tubular walls contiguous with the spacer wall. For example, on spacer wall 44*a* the closest to the axis, the apertures 54 extend into the base of the walls 32*a* and 32*b*.

Under these conditions, it is observed that the two ends of each aperture are formed by thicknesses of material that are greater than in the median region thereof.

Figure 4:
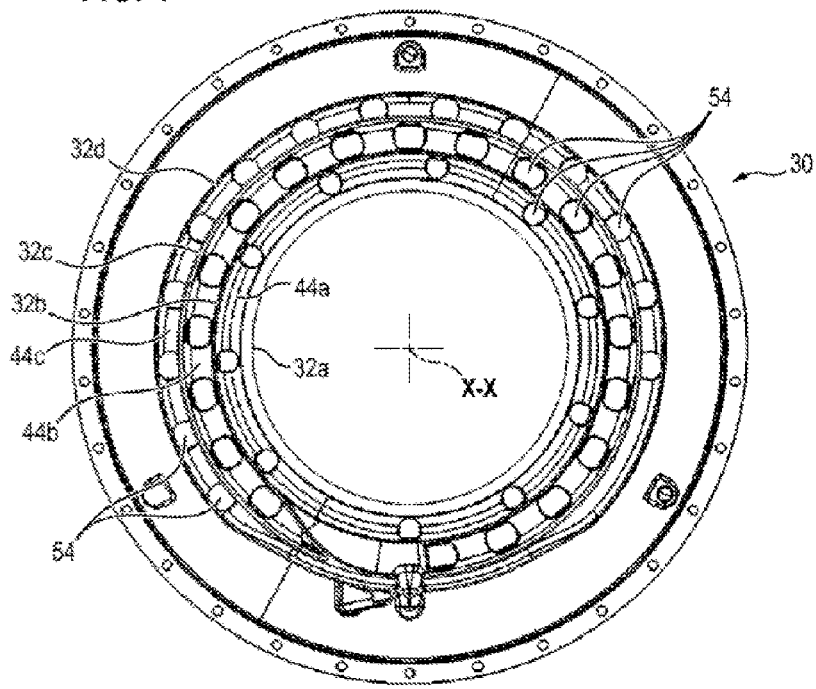
FIG. 4 is an elevated view from the front of the ring in the preceding Figure.

As can be seen in FIG. 4, in the present example, the apertures 54 are in a staggered arrangement. In other words, the apertures 54 of the median spacer wall 44*b* are offset in relation to those of the two other spacer walls, which are aligned together in directions radial to axis X-X. This arrangement is preferable when each spacer wall is considered to be flexible as is the case here. If, on the contrary, the dimensions and in particular the thickness thereof are such that it can be considered to be rigid, the apertures of the three spacer walls can be arranged to coincide with each other. Under these conditions, each aperture of one of the walls is aligned with an aperture of each of the other walls in a direction radial to the axis.

Spacer wall 44c lies further distant from the axis than the two others. As can be seen in FIG. 4, it has lower apertures 54 which extend into a lower part of the wall and solely into the left half of the wall in relation to the axis. In other words, they lie in the lower left quadrant. These two apertures do not have any equivalent or counterpart in the lower right quadrant i.e. in the right-side half of the ring. These two apertures therefore form additional apertures on this wall, they act to prevent spattering of oil-containing air.

A minimum thickness of approximately 1.5 mm can be given to the tubular walls and spacer walls, for large-sized parts, to prevent any deformation.

The diameter of the apertures can vary from one engine to another as a function of ventilation and cooling specifications. The same applies to the arrangement and distribution thereof. The diameter, number and positioning of the apertures can differ from one spacer wall to another within one same engine. The apertures are preferably positioned in the top part of the ring.

The ring 30 is obtained by additive manufacturing (or 3D printing) and in the present example by laser beam melting (LBM) known per se.

Conforming to the method of the invention, in the present embodiment of this method, the ring 30 is constructed by depositing successive layers of powder, each layer being selectively melted by the laser beam before depositing the following layer. The layers correspond to successive sections of the ring 30 in planes perpendicular to the axis X-X, the layers being deposited starting with the aftmost (or downstream) layer i.e. on the right in FIG. 3. This allows the constructing of the support of each tubular wall, formed in general by a spacer wall, before constructing the tubular wall.

Therefore, for each frustoconical spacer wall 44a-c, the construction of the wall starts with the widest section of the conical frustum. A detailed illustration is given in FIG. 9 of the construction of a portion of one of the spacer walls having an aperture 54.

The construction of this wall starts with the distal portion illustrated by line 58. However, shortly after the start of this construction, the construction is started of the other proximal portion identified by line 56. This portion is constructed at the same time as the construction of the base. Since the base has a relatively large thickness, the construction of this proximal portion can be carried out without any risk of collapse. When the construction of the proximal and distal portions has sufficiently progressed, they join up in the median part of the spacer wall at the point indicated by arrow 60.

If, for the sake of convenience, the term construction of each aperture 54 is used, it can be seen that this construction starts at the two ends of the aperture and ends at the median portion thereof.

This applies to all the apertures when constructing the part. In particular, all the apertures of one same spacer wall are constructed simultaneously.

Figure 9:
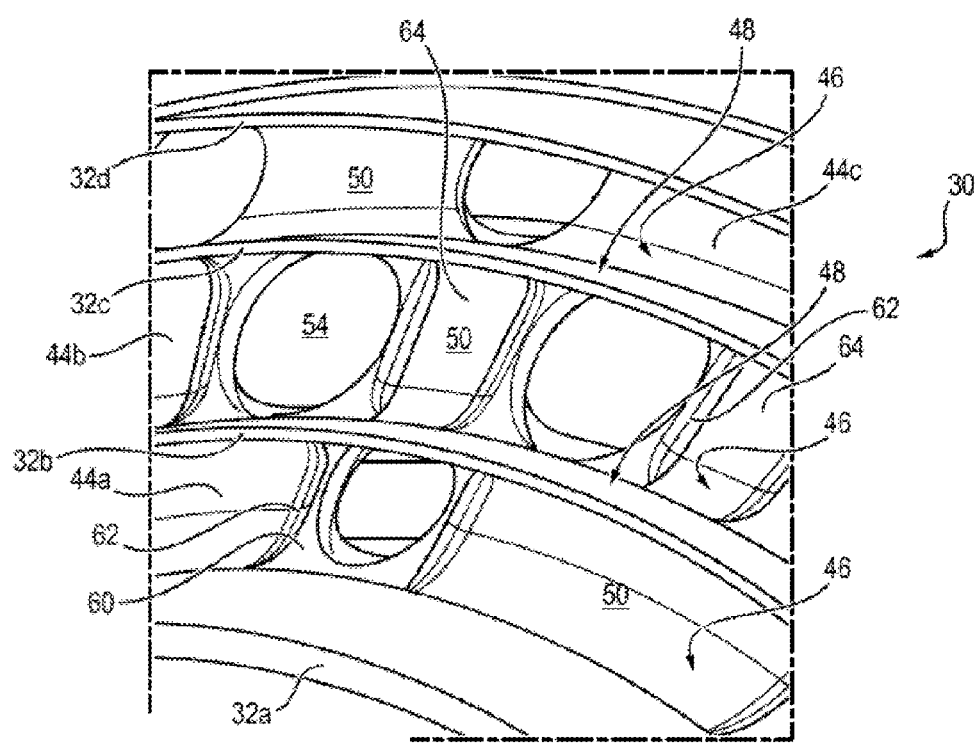
FIG. 9 is a similar view to FIG. 5 illustrating a variant.

In the variant in FIG. 9, each spacer wall 44a-c around each aperture 54 has a rim 60, the thickness over the entire rim being greater than the thickness of the spacer wall away from the rim. In other words, the spacer walls 44a-c have local extra thickness 60 around each aperture 54. Each aperture is therefore delimited by two steps 62 which each form a transition between the extra thickness 60 contiguous with the aperture and the zone 64 lying between two extra thicknesses. This extra thickness facilitates forming of the aperture by additive manufacturing and increases the strength of the wall around the aperture.

Numerous modifications can be made to the invention without departing from the scope thereof.

In particular the number of tubular walls and spacer walls can be modified.

The invention claimed is:

1. A ventilation ring for a bearing support member of an aircraft turbine engine, the ventilation ring comprising:
    at least two tubular walls extending opposite each other,
        at least one of the at least two tubular walls comprising a main portion and a base,
        the base having a thickness greater than a thickness of the main portion, and
    at least one spacer wall connecting the tubular walls,
    the at least one spacer wall having at least one aperture extending into the base,
    the at least one spacer wall having a rim around the at least one aperture,
    an entirety of the rim having a thickness greater than a thickness of the at least one spacer wall at a distance from the rim.

2. The ventilation ring according to claim 1, wherein the base has at least one surface with a rounded concave profile forming a transition from one surface of the at least one of the at least two tubular walls to a surface of the at least one spacer wall.

3. The ventilation ring according to claim 1, wherein the at least one aperture extends into the base of the at least two tubular walls.

4. The ventilation ring according to claim 1, wherein the at least one aperture comprises a plurality of apertures, and the plurality of apertures extend into the base of the at least one of the at least two tubular walls or into the base of the at least two tubular walls.

5. The ventilation ring according to claim 1, wherein the at least one aperture comprises a plurality of apertures, and the at least one spacer wall comprises at least two spacer walls, each having the plurality of apertures.

6. The ventilation ring according to claim 5, wherein the apertures are in a staggered arrangement.

7. The ventilation ring according to claim 5, wherein the apertures coincide with each other.

8. The ventilation ring according to claim 1, wherein the at least two tubular walls comprise at least four tubular walls.

9. The ventilation ring according to claim 1, wherein the at least one spacer wall comprises at least two spacer walls,
    wherein one of the at least two spacer walls lies at a greater distance from an axis of the ventilation ring than remaining spacer walls of the at least two spacer walls, and
    wherein the at least one apertures comprises lower apertures that extend into a lower part of the at least one spacer wall,
    the lower part being at a greater distance from the axis than other parts of the at least one spacer wall, and the lower apertures all lying in solely one from among left and right halves of the at least one spacer wall in relation to the axis.

10. An aircraft turbine engine comprising the ventilation ring according to claim 1.

11. A method for manufacturing a ventilation ring for a bearing support member of an aircraft turbine engine,
the method comprising manufacturing the ventilation ring via additive manufacturing, the ventilation ring comprising:
at least two tubular walls extending opposite each other,
at least one of the at least two tubular walls comprising a main portion and a base,
the base having a thickness greater than a thickness of the main portion, and
at least one spacer wall connecting the at least two tubular walls,
the at least one spacer wall having at least one aperture extending into the base,
the at least one spacer wall having a rim around the at least one aperture,
an entirety of the rim having a thickness greater than a thickness of the at least one spacer wall at a distance from the rim.

12. The method according to claim 11, wherein the additive manufacturing step comprises laser beam melting.

\* \* \* \* \*